(12) United States Patent
Jeong et al.

(10) Patent No.: US 11,818,473 B2
(45) Date of Patent: Nov. 14, 2023

(54) ULTRATHIN CAMERA DEVICE USING MICROLENS ARRAY, AND MULTI-FUNCTIONAL IMAGING METHOD USING THE SAME

(71) Applicant: KOREA ADVANCED INSTITUTE OF SCIENCE AND TECHNOLOGY, Daejeon (KR)

(72) Inventors: Ki-Hun Jeong, Daejeon (KR); Kisoo Kim, Daejeon (KR); Kyung-Won Jang, Daejeon (KR); Sang-In Bae, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 276 days.

(21) Appl. No.: 17/159,471

(22) Filed: Jan. 27, 2021

(65) Prior Publication Data
US 2021/0385376 A1 Dec. 9, 2021

(30) Foreign Application Priority Data
Jun. 5, 2020 (KR) .......................... 10-2020-0068343

(51) Int. Cl.
*H04N 5/335* (2011.01)
*H04N 23/951* (2023.01)
(Continued)

(52) U.S. Cl.
CPC ......... *H04N 23/951* (2023.01); *G02B 3/0037* (2013.01); *G02B 13/0085* (2013.01); *H04N 23/55* (2023.01)

(58) Field of Classification Search
CPC .......................... G02B 13/0085; G02B 3/0037
See application file for complete search history.

(56) References Cited

U.S. PATENT DOCUMENTS

| 7,897,903 B2 | 3/2011 | Duparre et al. |
| 9,578,237 B2 * | 2/2017 | Duparre ............... H04N 13/271 |

(Continued)

FOREIGN PATENT DOCUMENTS

| JP | 1997-026752 | 1/1997 |
| JP | 2004-506919 | 3/2004 |

(Continued)

OTHER PUBLICATIONS

Kisoo Kim et al., "Biologically inspired ultrathin arrayed camera for high-contrast and high-resolution imaging", Light: Science & Applications vol. 9, Article No. 28, Feb. 27, 2020, https://doi.org/10.1038/s41377-020-0261-8.

(Continued)

*Primary Examiner* — Gary C Vieaux
(74) *Attorney, Agent, or Firm* — LEX IP MEISTER, PLLC

(57) ABSTRACT

An ultrathin camera device is provided. The ultrathin camera device comprises an optical module including a microlens array in which microlenses are arranged, an image sensor that outputs electrical image signals by sensing light coming through the microlens array, spacers that form a focal length by separating the optical module from the image sensor, and a processor that outputs a final image by reconstructing array images generated from the image signals with a designated imaging process depending on a distance at which the object is located. Here, each microlens convexly protrudes toward the image sensor.

7 Claims, 13 Drawing Sheets

(51) Int. Cl.
*G02B 3/00* (2006.01)
*G02B 13/00* (2006.01)
*H04N 23/55* (2023.01)

(56) References Cited

U.S. PATENT DOCUMENTS

| | | | | |
|---|---|---|---|---|
| 2009/0060281 | A1* | 3/2009 | Tanida | H04N 25/41 |
| | | | | 382/106 |
| 2012/0218448 | A1* | 8/2012 | Ueno | G02B 3/0037 |
| | | | | 348/294 |
| 2013/0002829 | A1* | 1/2013 | Soerensen | G01S 5/16 |
| | | | | 416/61 |
| 2014/0027612 | A1* | 1/2014 | Oganesian | H01L 27/14625 |
| | | | | 250/208.1 |
| 2014/0285693 | A1 | 9/2014 | Kobayashi et al. | |
| 2018/0096527 | A1* | 4/2018 | Eraker | G06F 3/04815 |

FOREIGN PATENT DOCUMENTS

| | | |
|---|---|---|
| JP | 5001075 | 8/2012 |
| KR | 10-2013-0006503 | 1/2013 |
| KR | 10-2014-0115128 | 9/2014 |
| KR | 10-2016-0131600 | 11/2016 |
| KR | 10-2017-0023103 | 3/2017 |
| KR | 10-2018-0062402 | 6/2018 |
| WO | 2010/121637 | 10/2010 |
| WO | 2011/063347 | 5/2011 |

OTHER PUBLICATIONS

Hongtao Han et al., "Wafer Level Camera technology—from wafer level packaging to wafer level integration," 2010 11th international Conference on Electronic Packaging Technology & High Density Packaging, Xi'an, China, 2010, pp. 121-124, doi: 10.1109/ICEPT.2010.5582473.

* cited by examiner

ULTRATHIN CAMERA DEVICE USING MICROLENS ARRAY, AND MULTI-FUNCTIONAL IMAGING METHOD USING THE SAME

CROSS-REFERENCE TO RELATED APPLICATION

This application claims priority to and the benefit of Korean Patent Application No. 10-2020-0068343 filed in the Korean Intellectual Property Office on Jun. 5, 2020, the entire contents of which are incorporated herein by reference.

BACKGROUND

(a) Field

The present disclosure relates to an imaging technology.

(b) Description of the Related Art

Recently, researches for developing various applications using acquired images have been conducted in the field of vision technology. However, there is a limit to applications that can be provided for a single lens or dual lens.

A conventional lens has a focal length longer than an imaging surface of an object placed at a short distance, which causes getting out of focus. Therefore, the conventional camera has a limitation in simultaneously performing long-distance imaging and short-distance imaging. To make up for this, short-distance imaging, medium-distance, and long-distance imaging may be performed using microlenses having different focal lengths. However, at this time, the viewing angle of the image acquired by each lens gets different, which results in deteriorating the resolution upon reconstructing an image.

In the conventional camera, image distortion may occur due to the rolling shutter effect. Meanwhile, in comparison with a rolling shutter image sensor, a global shutter image sensor requires a pixel level memory and a low fill factor of a photodiode therein causes increasing noise upon imaging in a dark area. Further, due to complicated structure, manufacturing cost of the global shutter image sensor is high.

SUMMARY

The present disclosure provides an ultrathin camera device that simultaneously images objects placed in multiple planes of different distances by using a microlens array having a very short focal length and provides various applications by processing acquired array images in various ways.

The present disclosure provides a multifunctional imaging method for generating a microscopic image, a 3D depth image, a high dynamic range (HDR) image and the like by using an ultrathin camera device providing short-distance imaging, medium-distance imaging, and long-range imaging.

The present disclosure provides an ultrathin camera device that acquires images at different moments using a rolling shutter-type image sensor and a microlens array and generates high frame rate images/high-speed images by combining the acquired images.

According to an embodiment, a camera device may be provided. The camera device comprises an optical module including a microlens array in which microlenses are arranged, an image sensor that outputs electrical image signals by sensing light coming through the microlens array, spacers that form a focal length by separating the optical module from the image sensor, and a processor that outputs a final image by reconstructing array images generated from the image signals with a designated imaging process depending on a distance at which the object is located. Each microlens has a shape of convexly protruded toward the image sensor.

The optical module may comprise a transparent substrate, a pinhole array layer that transmits light coming through the transparent substrate to the microlens array through pinholes filled with transparent material, and the microlens array that is arranged corresponding to the pinholes of the pinhole array layer.

Each of the spacers may be a micro-pillar to which an adhesive is applied, one end of which may be fixed to the image sensor and the other end of which may be fixed to the optical module.

The processor may generate a microscopic image by stitching the array images captured in a short-distance plane.

The processor may generate a 3D depth image by estimating a depth based on a disparity among the array images captured in a medium-distance plane.

The processor may generate a high dynamic range (HDR) image by overlapping the array images captured in a long-distance plane.

The processor may generate high frame rate images by concatenating the array images captured at different moments.

The processor may determine a distance plane where an object is located by using a difference in viewing angles seen from the microlenses.

The processor may determine that the object is placed in a short-distance plane when a distance calculated using a distance between two microlenses, a focal length of the microlens, and the difference in the viewing angles falls within an imaging range of one microlens.

According to an embodiment, a multifunctional imaging method may be provided. The multifunctional imaging method comprises acquiring array images captured through microlenses arranged on a plane, and generating at least one of a microscopic image, a 3D depth image, an HDR image, and high frame rate images by reconstructing the array images.

Generating the at least one may comprise generating the microscopic image by stitching the array images when partial areas of an object are captured through at least some microlenses, or generating the 3D depth image by estimating a depth based on a disparity among the array images when a viewing direction of the object seen through each microlens is different, or generating the HDR image by overlapping the array images when the viewing direction of the object seen through each microlens is the same.

Generating the at least one may comprise generating the high frame rate images by combining the array images captured through each microlens at different moments.

Generating the at least one may comprise determining a distance plane where the object is placed by using a difference in viewing angles seen through the microlenses, and generating a final image by reconstructing the array images with an imaging process designated for the determined distance plane.

The array images may be captured through the microlenses with a fixed focal length, and a reconstructing process may be changed depending on the difference in the viewing angles seen from the microlenses.

The microlenses may be made to align with the pinholes in the pinhole array layer having pinholes filled with transparent material, and may form a focus on the image sensor by refracting light coming through the pinholes.

According to an embodiment, objects placed on multiple planes can be simultaneously imaged using an ultrathin camera device, and very fast moving objects can be imaged at different moments. As a result, multifunctional applications such as microscope imaging at a short distance, 3D imaging at a medium distance, HDR imaging at a long distance, high speed imaging, and the like may be provided.

According to an embodiment, since an ultrathin camera device has a very short focal length, not only long-distance imaging but also imaging an object placed at a very short distance without being out of focus is possible. According to an embodiment, an ultrathin camera device can photograph close-ups for various purposes such as fingerprint recognition and skin photographing, and can generate a microscopic image.

According to an embodiment, since an ultrathin camera device has the same viewing angle and the same pitch, the distance from the object can be predicted through the degree of overlapping depending on the location of an object. According to an embodiment, an ultrathin camera device can generate a 3D image by reconstructing images based on distance information of an object.

According to an embodiment, an ultrathin camera device can generate a HDR image by overlapping images acquired from lenses.

According to an embodiment, an ultrathin camera device can generate high frame rate images by instantaneously capturing a very fast moving object while reducing image distortion caused by a rolling shutter effect.

According to an embodiment, due to being manufactured to be ultrathin, an ultrathin camera device can be mounted on small devices such as a smartphone and a drone.

DETAILED DESCRIPTION OF THE EMBODIMENTS

Figure 1:
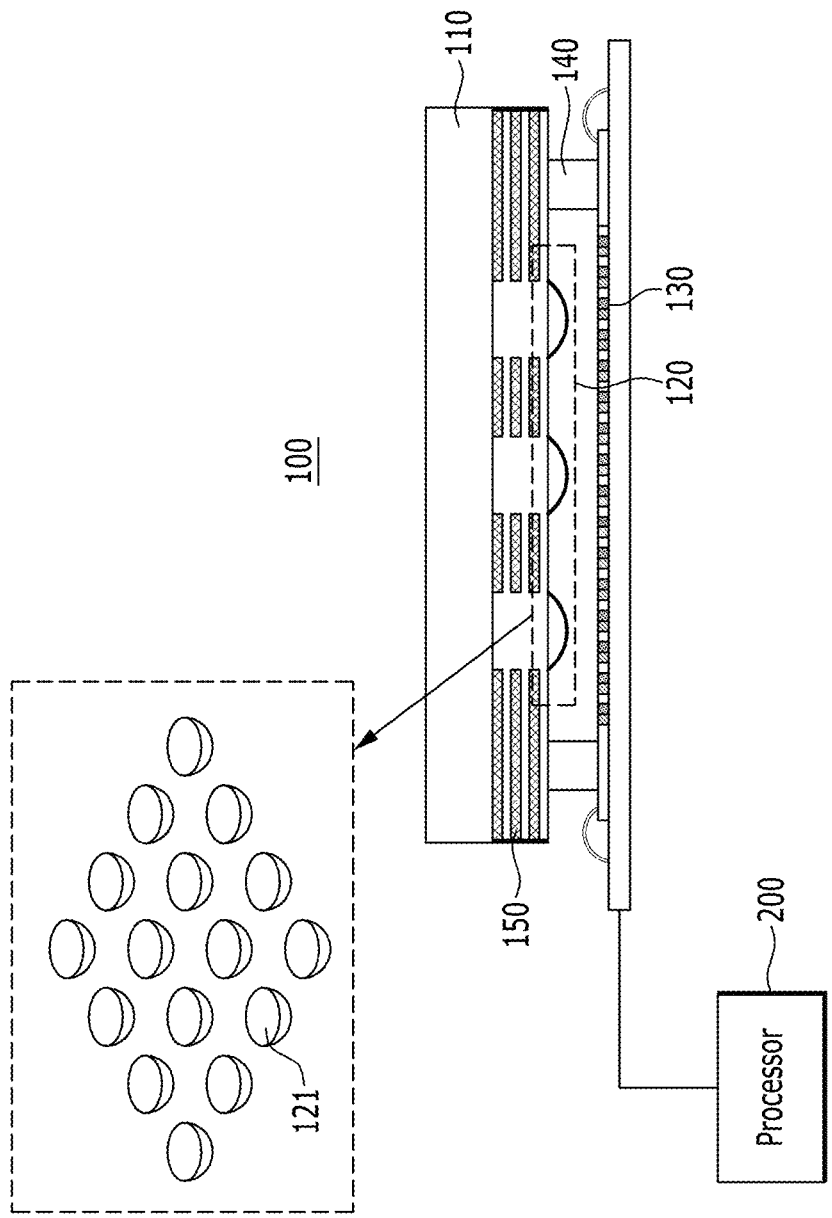
FIG. 1 is a configuration diagram of an ultrathin camera device according to an embodiment.

Hereinafter, embodiments of the present invention will be described in detail with reference to the attached drawings so that the person of ordinary skill in the art may easily implement the present invention. However, the present invention may be modified in various ways and is not limited to the embodiments described herein. In the drawings, elements irrelevant to the description of the present invention are omitted for simplicity of explanation, and like reference numerals designate like elements throughout the specification.

Throughout the specification, when a part is referred to "include" a certain element, it means that it may further include other elements rather than exclude other elements, unless specifically indicates otherwise. In the description, the terms "-er", "-or", "unit", and "module" described in the specification mean units for processing at least one function and operation, and can be implemented by software, hardware, or a combination thereof.

FIG. 1 is a configuration diagram of an ultrathin camera device according to an embodiment.

Referring to FIG. 1, an ultrathin camera device 100 may simultaneously perform imaging the objects placed on multiple planes at different distances by using a microlens array and may provide various applications by processing array images acquired through multiple plane imaging in various ways. The ultrathin camera device 100 may provide, for example, a microscopic image generated through short-distance imaging, a 3D depth image generated through medium-distance imaging, and a high dynamic range (HDR) image generated through long-distance imaging. Further, the ultrathin camera device 100 may provide high frame rate images (high speed images) composed of images captured at different moments.

The ultrathin camera device 100 includes an optical module including a transparent substrate 110 (e.g., glass wafer) and a microlens array 120, an image sensor 130 that senses light coming through the microlens array 120 to output an electrical image signal, and a spacer 140 that separates the optical module and the image sensor 130 to form a focal length. The ultrathin camera device 100 may further include a processor 200 that processes image signals sensed by the image sensor 130. For the convenience of explanation, the optical module including the microlens array 120, the image sensor 130, and the spacer 140 are referred to as a packaged camera module. The ultrathin camera device 100 may further include a memory for storing image signals and images.

The optical module of the ultrathin camera device 100 may further include a pinhole array layer 150 that transmits light coming through the transparent substrate 110 to the microlens array 120. The pinhole array layer 150 is formed by placing pinholes filled with transparent material on an absorbing layer made of light-absorbing material so as to correspond to a pattern of the microlens array 120. Light passes through only the pinholes of the transparent material and is absorbed in an area other than the pinholes to block the light transmitted to the microlens array 120. The pinhole array layer 150 may be manufactured in a multilayer structure where absorbing layers for absorbing light and transparent layers for making light pass through are alternately stacked. At this time, the absorbing layer may have openings formed by a mask pattern manufactured corresponding to the pattern of the microlens array 120. The pinholes may act as an aperture for the camera.

The transparent substrate 110 may be a substrate made of a transparent glass material capable of making light passing.

The microlens array 120 has a structure in which a plurality of microlenses 121 of a micro scale are arranged, and may include, for example, microlenses arranged in a flat lattice pattern. Each microlens 121 is aligned with the pinholes of the pinhole array layer 150 and has a convexly protruded shape. The microlens 121 forms a focus on the image sensor 130 by refracting the light coming through the transparent substrate 110 and can receive only the light coming through the pinholes of the pinhole array layer 150. At this time, since the microlens 121 has a very short focal length, an ultrathin camera can be manufactured.

The microlens array 120 is packaged with the convex side of the microlens 121 facing the image sensor 130. As a result, the microlens array 120 can concentrate the light coming through the pinhole array layer 150 on the image sensor 130.

The image sensor 130 is separated from the pinhole array layer 150 by the spacer 140 and receives the light passing through the microlens array 120. The image sensor 130 may be, for example, a CMOS image sensor, but the types of image sensors may be various. The image sensor 130 is a device that converts the light coming through the microlens array 120 into an electrical signal. The image sensor 130 can detect light corresponding to a red channel, a green channel, and a blue channel through an RGB color filter and output signals representing the intensities of the corresponding colors.

The spacer 140 combines the image sensor 130 and the optical module including the microlens array 120 with being separated by a focal length. The spacer 140 is made of micro-pillars, both ends of each of which may be attached to the image sensor 130 and the optical module through an epoxy adhesive, respectively. As a result, it may be possible to package in the form of an ultrathin camera device. Here, the optical module to which the spacer 140 is attached may be a transparent substrate 110 or the pinhole array layer 150 on which the microlens array 120 is formed. The position of spacer 140 may be variously designed. The height of the spacer 140 is the same as the focal length of the microlens 121, and a tolerance of the height of the micro-pillars may be set according to a depth of focus of the microlens 121.

Meanwhile, since packaging a lens with a short focal length is difficult, a camera using a conventional microlens array has a limit in performing short-distance imaging. That is, in order to perform short-distance imaging without being out-of-focus, a lens with a focal length of about 170 μm should be precisely packaged with an image sensor. To solve such a problem, the spacer 140 is fixed to the image sensor 130 by applying epoxy using a dispenser, and then the optical module including the microlens array 120 is aligned with the image sensor 130 using a flip chip bonding technique. As a result, the optical module and the image sensor 130 can be precisely packaged.

The processor 200 may generate a plurality of images (array images) imaged by a plurality of microlenses using image signals output from the image sensor 130. In addition, the processor 200 processes array images with various image processing algorithms to generate a microscopic image, a 3D depth image, a HDR image, and high frame rate images. In order to distinguish the image acquired by the microlenses from the image generated through reconstructing the images acquired by the microlenses, the image acquired by the microlens is referred to as the array image. In addition, in order to classify imaging through each microlens, each microlens may be classified by assigning a channel identifier thereto. The processor 200 implements the method of the present disclosure by executing instructions included in at least one computer program. The computer program includes instructions that implement the method of the present disclosure, and may be stored in a non-transitory computer readable storage medium.

Meanwhile, the processor 200 may be divided into a processor that generates the array images by processing electrical image signals acquired by the image sensor 130, and a processor that processes the array images with various image processing algorithms. For example, the main processor of an apparatus equipped with the ultrathin camera device 100 executes a multifunctional imaging application and can generate a microscopic image, a 3D depth image, a HDR image, and high frame rate images by processing the array images with various image processing algorithms. However, in the following description, it is assumed that the processor 200 performs multifunctional imaging processing.

Figure 2:
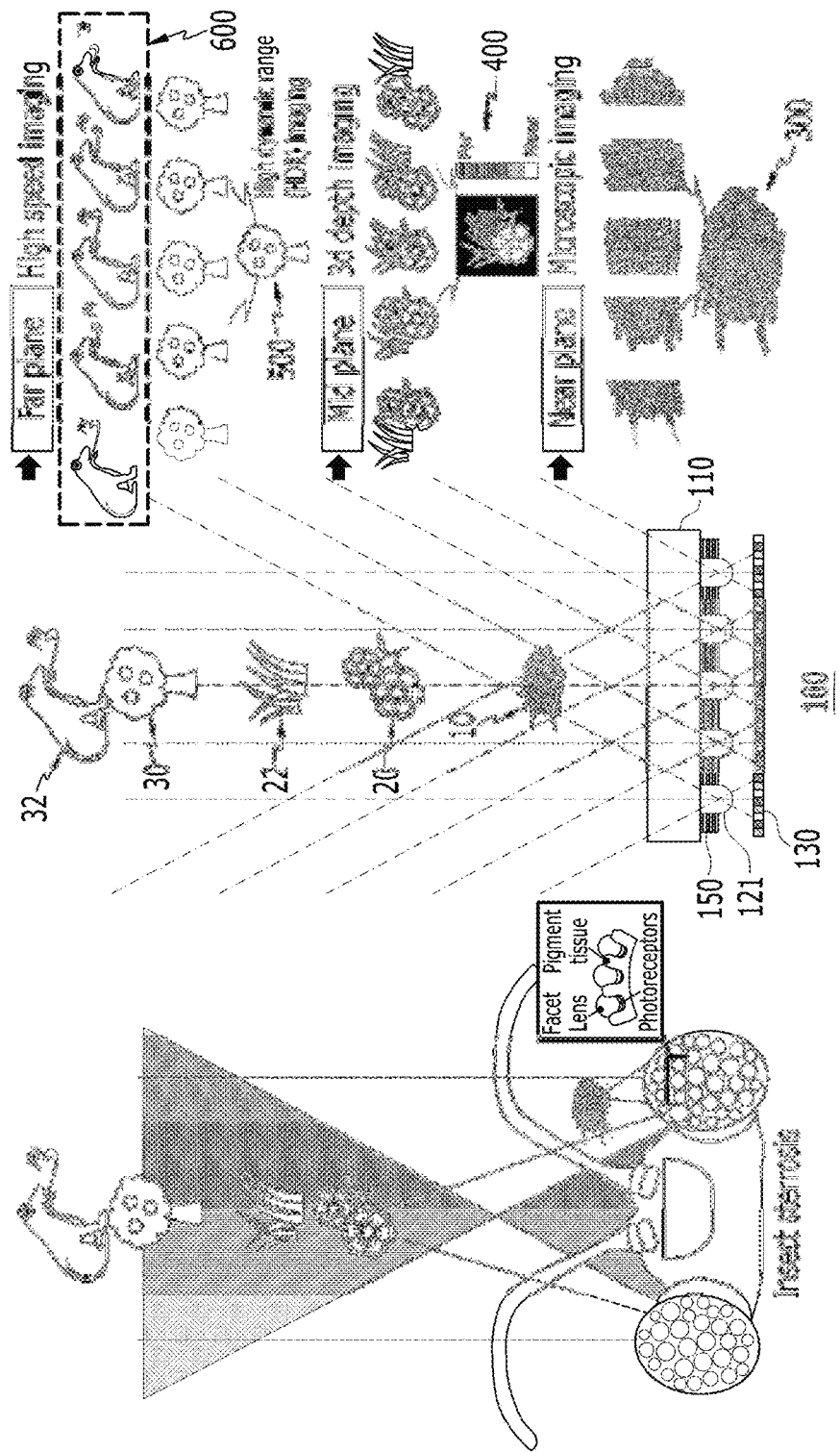
FIG. 2 is a diagram for explaining a multifunctional application of an ultrathin camera device according to an embodiment.

FIG. 2 is a diagram for explaining a multifunctional application of an ultrathin camera device according to an embodiment.

Referring to FIG. 2, insects capture many scenes of an object at one time through visual information obtained from facet lenses. The ultrathin camera device 100 is a device that emulates this insect stereopsis and performs imaging by combining a microlens array 120 with an image sensor 130. Here, in the microlens array 120, a plurality of microlenses 121 corresponding to the facet lens are arranged. In this case, pigment cells blocking light passing through spaces among lenses may be emulated as a pinhole array layer 150 that has pinholes formed on an absorbing layer absorbing light.

The ultrathin camera device 100 can capture array images being in focus through the microlens array 120. Here, a field-of-view seen from each microlens varies according to a distance from the object. Accordingly, the ultrathin camera device 100 can perform imaging objects placed on multiple planes of short-distance plane (near plane), medium-distance plane (mid plane), and long-distance plane (far plane) by reconstructing the array images captured with different field-of-view according to the distance, with different methods.

For example, in the case of an object 10 placed in a short distance, a partial area of the object 10 is captured through each microlens taking a close-up of the object. Accordingly, the ultrathin camera device 100 may generate a single microscopic image 300 by combining the array images obtained through capturing partial areas of the object into one. For example, using an image stitching technique, the ultrathin camera device 100 may find a similar pattern of images acquired from each microlens and generate a single large panoramic image through concatenating similar parts.

In the case of objects 20, and 22 placed in a medium distance, the viewing directions of the object seen through each microlens are different. Therefore, the ultrathin camera device 100 extracts a disparity among the array images and estimates the depth (distance) of each object based on the disparity. The ultrathin camera device 100 may generate a 3D depth image 400 including depth information. The ultrathin camera device 100 may extract objects from the images acquired by each microlens and extract the disparity of each object by overlapping the array images.

In the case of an object 30 positioned at a long distance, the object 30 is captured in the same viewing direction through each microlens. In other words, each array image may include the object 30 identically. Therefore, the ultrathin camera device 100 can generate a HDR image 500 by overlapping the array images. The ultrathin camera device 100 may arrange images based on the center of the microlens and then up-sampling the array images through interpolation, which improves image resolution.

In addition, in the case of the object 32 positioned at the long distance, the object 32 may be sequentially captured through each microlens in the rolling shutter direction due to the rolling shutter effect of the image sensor. The ultrathin camera device 100 can generate high frame rate images 600 by combining array images captured in a relatively short time.

Figure 3A:
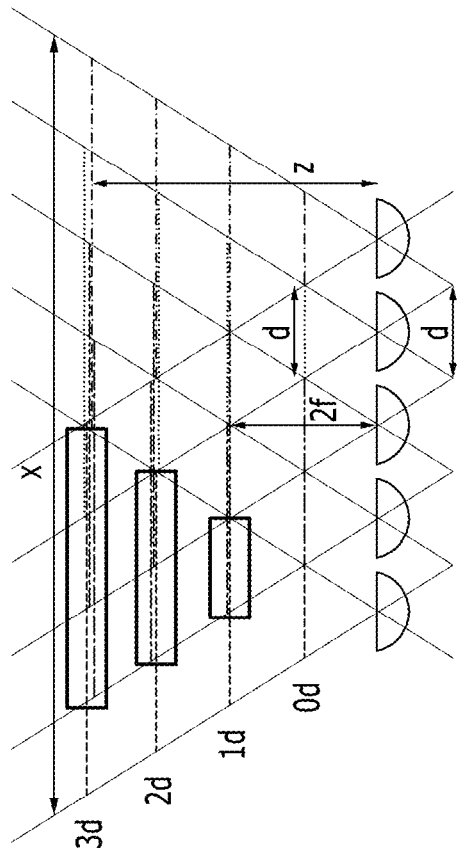
FIG. 3A and FIG. 3B are diagrams for explaining a method of determining a distance range of multiple planes using a microlens array according to an embodiment.
Figure 3B:
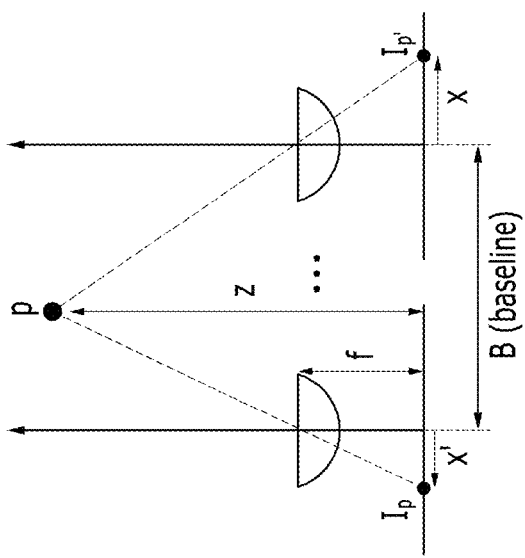

FIG. 3A and FIG. 3B are diagrams for explaining a method of determining a distance range of multiple planes using a microlens array according to an embodiment.

Referring to FIG. 3A and FIG. 3B, a plane on which an object is placed may be classified into short-distance, medium-distance, and long-distance by using the difference in viewing angles seen by each lens. The ultrathin camera device 100 can predict the distance of the object through the degree of overlapping according to the location of the object.

Referring to FIG. 3A, a disparity (x-x') of viewing angles between two lenses may be defined as in Equation 1. In Equation 1, B is a baseline between the two lenses, f is a focal length, and z is a vertical distance from a lens to an object P.

$$x - x' = \frac{Bf}{z} \quad \text{Equation 1}$$

The multiple planes may be classified into distance ranges as shown in Table 1. In Table 1, d is an imaging range of one lens.

TABLE 1

| Multiple plane | Distance range |
| --- | --- |
| Short distance | Front surface of lens ~ $\frac{Bf}{d}$ |
| Medium distance | $\frac{Bf}{d}$ ~ $\frac{Bf}{MLA\ resolution}$ |
| Long distance | $\frac{Bf}{MLA\ resolution}$ ~ maximum depth of focus |

Referring to FIG. 3B, the areas seen by the lenses may overlap. As the distance from the lens increases, the overlapping range increases.

In this way, the ultrathin camera device 100 can perform short-distance imaging as well as medium-distance and long-distance imaging by using a microlens array 120 with a very short focal length. While it is not easy to package the microlens array 120, the microlens array 120 and the image sensor 130 can be packaged using a spacer 140 mounted with flip chip bonding.

Figure 4:
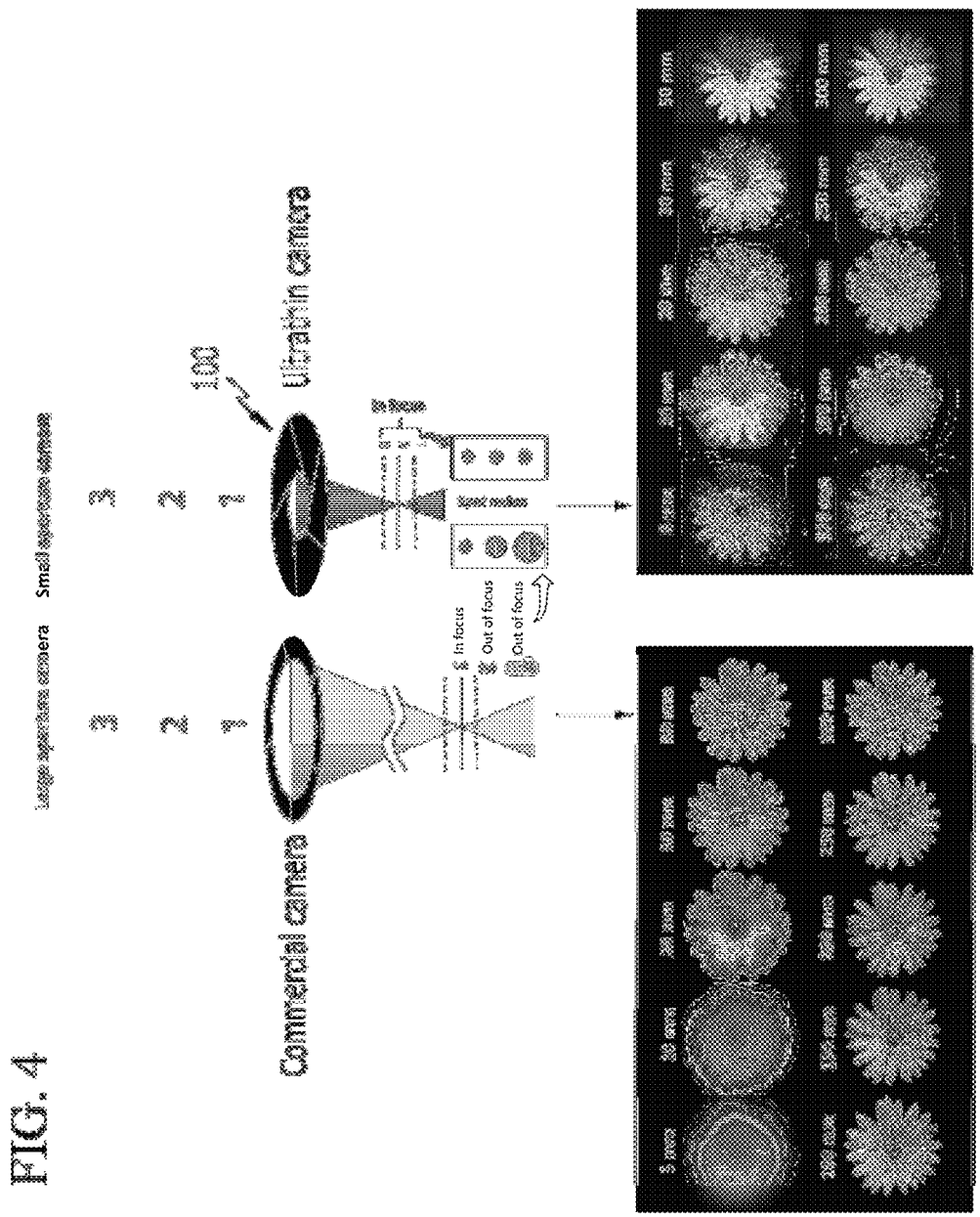
FIG. 4 is a diagram for explaining short-distance imaging of an ultrathin camera device according to an embodiment.
Figure 5:
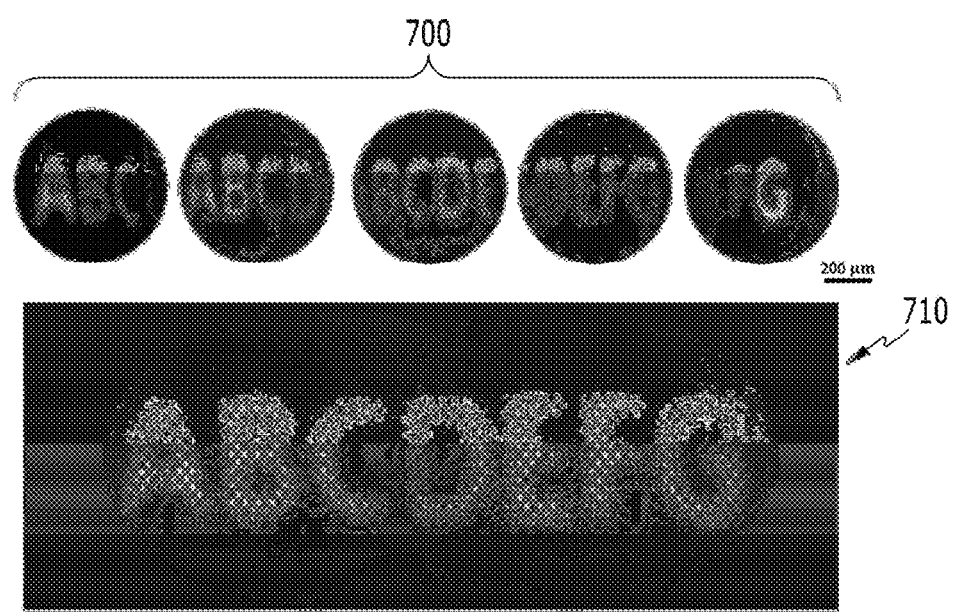
FIG. 5 is a diagram for explaining a result of short-distance imaging by an ultrathin camera device according to an embodiment.

FIG. 4 is a diagram for explaining short-distance imaging of an ultrathin camera device according to an embodiment, and FIG. 5 is a diagram for explaining a result of short-distance imaging by an ultrathin camera device according to an embodiment.

Referring to FIG. 4, the ultrathin camera device 100 has an aperture with a small diameter through a pinhole array layer 150 and a microlens array 120.

Looking at a plane focused on according to an aperture size and an object distance, while a commercial camera captures a blurry image of a short-distance object due to being out of focus, an ultrathin camera device 100 can acquire a clear image without getting out of focus at all short distance. According to the Gaussian lens formula (1/a+1/b=1/f), in a commercial lens with a long focal length, as the distance to the object gets closer, the distance change of an imaging surface increases. Thus, as the object gets closer to the lens, the imaging surface moves farther from the focal length. Conversely, in a microlens with a short focal length, the distance change of the imaging surface is small even though the distance to the object gets closer. Therefore, the imaging surface does not move away from the focal length even if the object gets closer to the lens. Accordingly, the ultrathin camera device 100 can acquire a clear image as above-described.

As such, the short focal length of the microlens enables the ultrathin camera device 100 to perform all-in-focus imaging from short-distance to long-distance, and can lead to reducing the minimum object distance (MOD). Here, the minimum object distance means the shortest distance from a camera to an object that makes camera to acquire a clear image.

Referring to FIG. 5, the ultrathin camera device 100 can perform imaging an object placed in short-distance through each microlens of the microlens array 120. The result of short-distance imaging is array images 700 acquired through the microlenses, and each of the array images may include a partial area of the object.

Also, the ultrathin camera device 100 can generate a single microscopic image 710 by combining the array images 700 acquired through short-distance imaging. The ultrathin camera device 100 may generate one large panoramic image by concatenating images acquired from each microlens using an image stitching technique.

FIG. 6A, FIG. 6B, FIG. 6C and FIG. 7 are diagrams for explaining a result of a medium-distance imaging by an ultrathin camera device according to an embodiment.

Figure 6A:
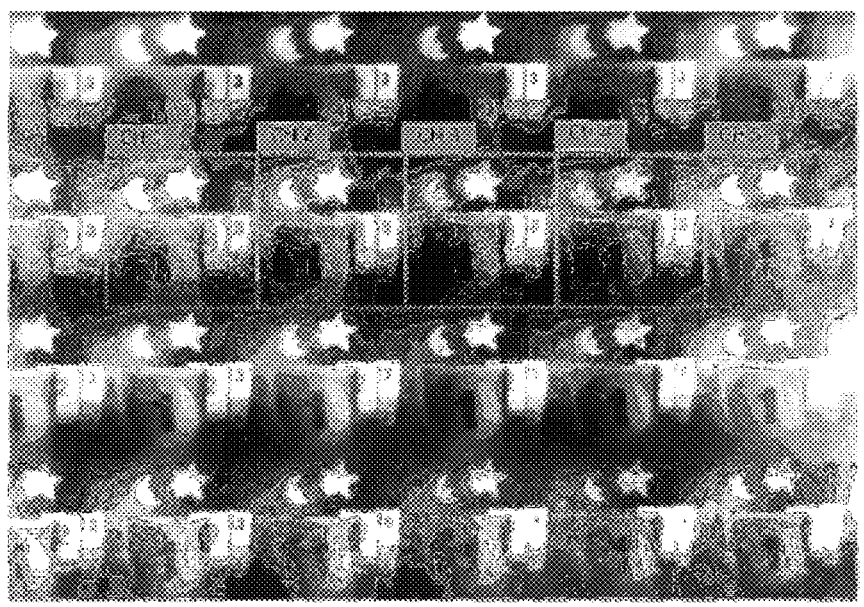
FIG. 6A, FIG. 6B, FIG. 6C and FIG. 7 are diagrams for explaining a result of medium-distance imaging by an ultrathin camera device according to an embodiment.

Referring to FIG. 6A, there is an imaging result of objects located at various distances within the medium-distance range through an ultrathin camera device 100. Array images have different viewing directions seen from each microlens. For example, it can be seen that a range where a number block of 2 overlaps a number block of 1 looks different depending on the location of the lens. Here, a channel may be assigned to classify array images acquired through the microlens.

Figure 6B:
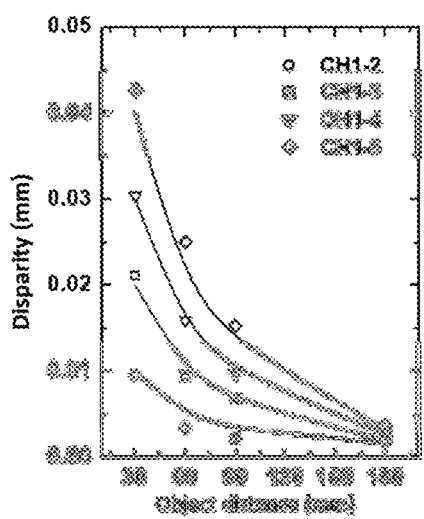
Figure 6C:
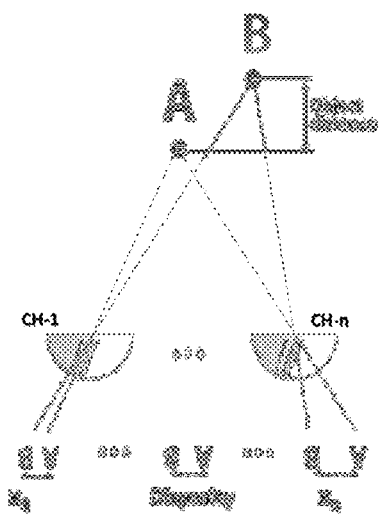

Referring to FIG. 6B, there is a relationship graph of disparities according to the object distance. Referring to FIG. 6C, there is a diagram for explaining the relationship between the disparity occurring between microlenses and the object distance. As a result of checking the disparity of each microlens by using objects located at various distances in the medium-distance range, it can be seen that the disparity increases as the distance between the lenses increases and the distance to the object decreases.

Figure 7:
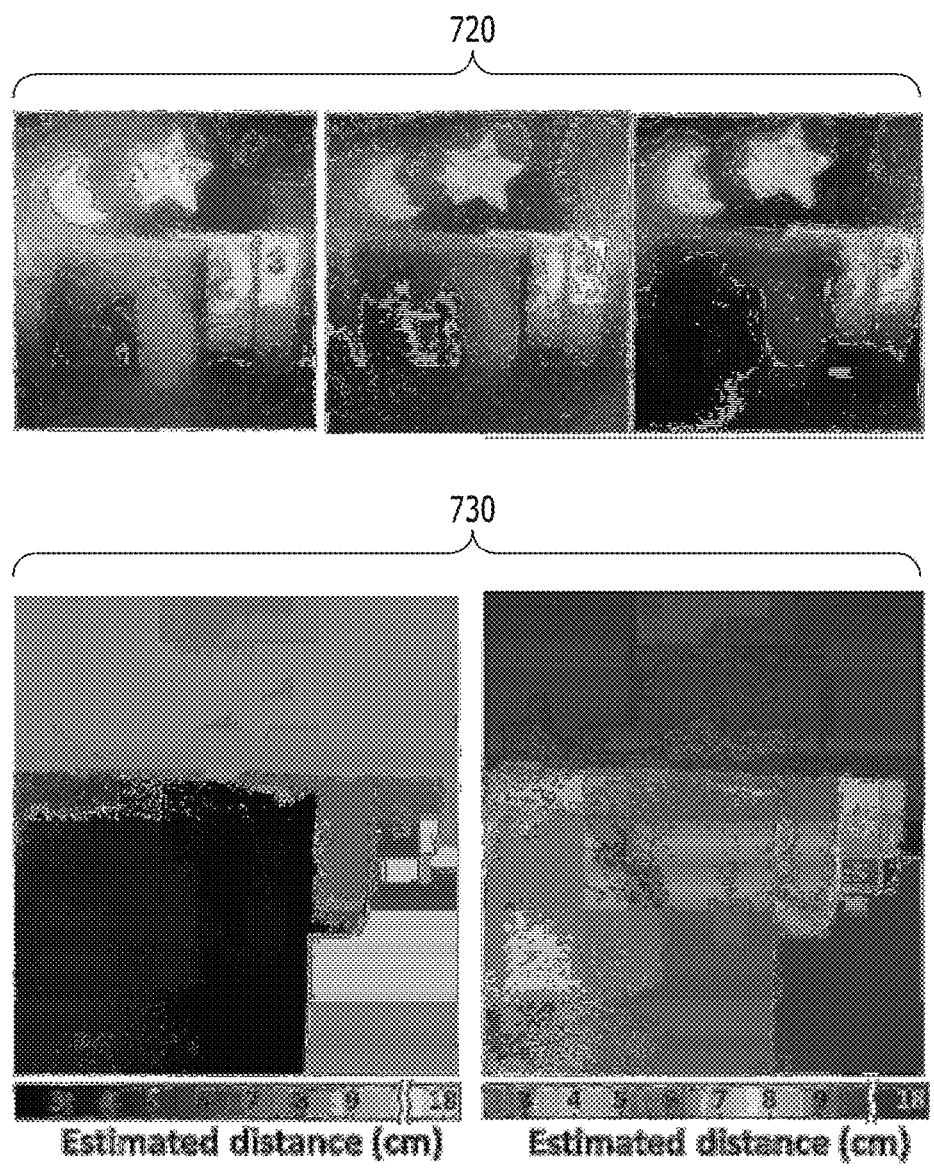

Referring to FIG. 7, there show a red-cyan anaglyph result 720 using a medium-distance imaging result, and a depth estimation result 730 obtained through medium-distance imaging.

The ultrathin camera device 100 may extract a disparity in the red-cyan anaglyph by using the array images acquired through medium-distance imaging, and may estimate a depth (distance) of each object based on the disparity. The ultrathin camera device 100 may generate a 3D depth image including depth information.

Figure 8:
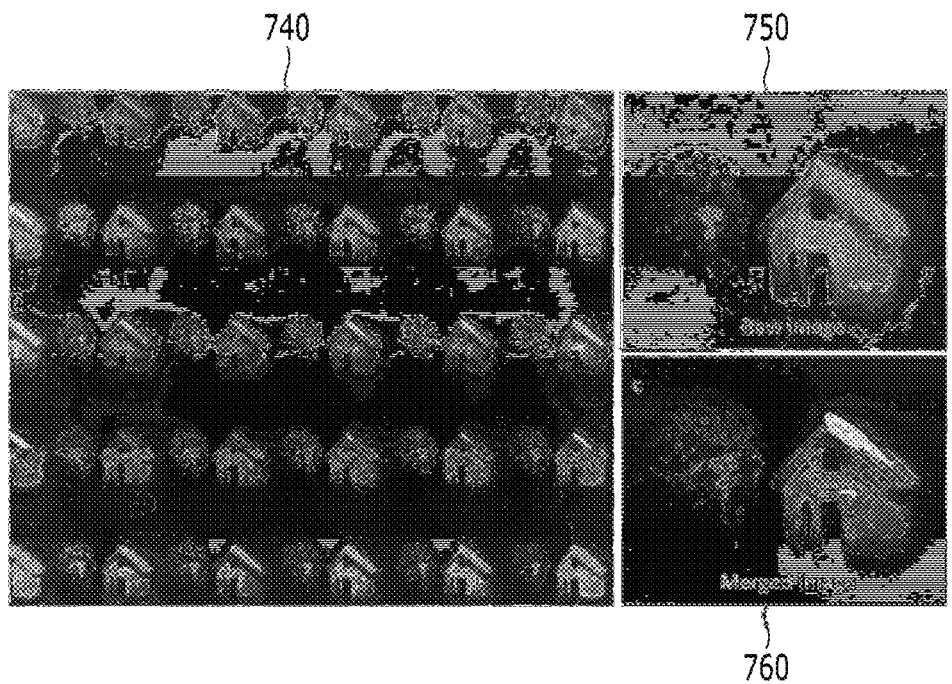
FIG. 8 is a diagram for explaining a result of long-distance imaging by an ultrathin camera device according to an embodiment.

FIG. 8 is a diagram for explaining a result of long-distance imaging by an ultrathin camera device according to an embodiment.

Referring to FIG. 8, there show a result 740 of imaging an object located at a long distance by the ultrathin camera device 100, an raw image 750 acquired through a specific lens among array images, and an merged image 760 acquired through combining the array images. Referring to the merged image 760, it can be seen that contrast and sharpness are improved.

The ultrathin camera device 100 may generate a HDR image by overlapping the array images.

Figure 9A:
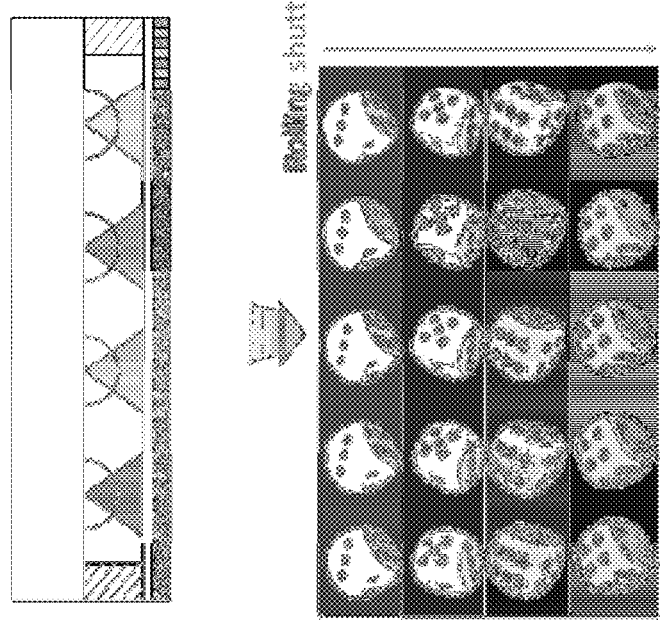
FIG. 9A and FIG. 9B are for explaining the rolling shutter phenomenon.
Figure 9B:
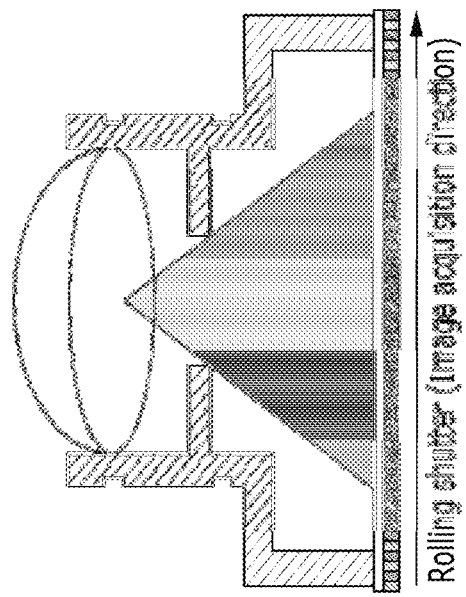
Figure 10:
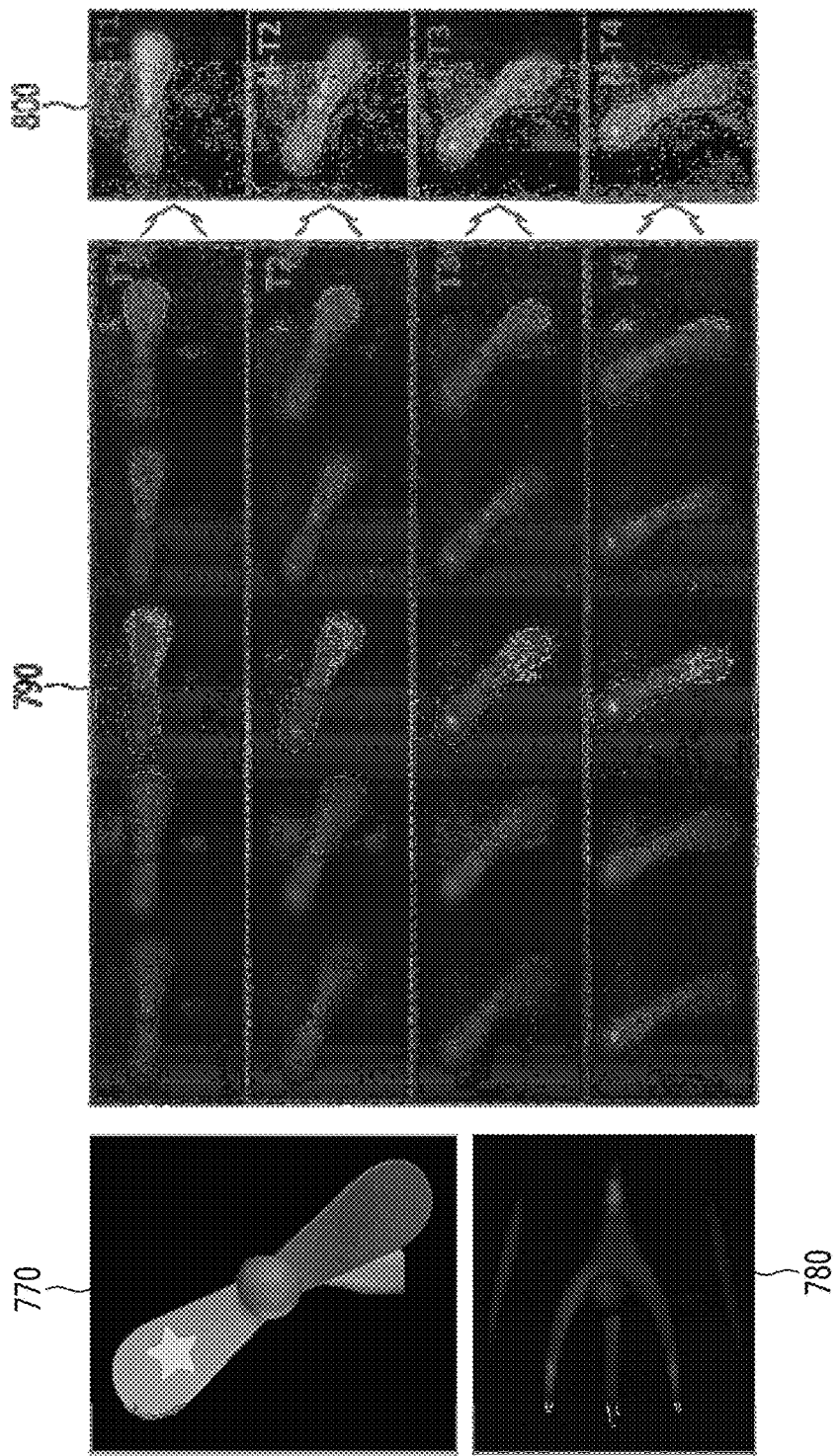
FIG. 10 and FIG. 11 are diagrams for explaining a result of high frame rate imaging of an ultrathin camera device according to an embodiment.
Figure 11:
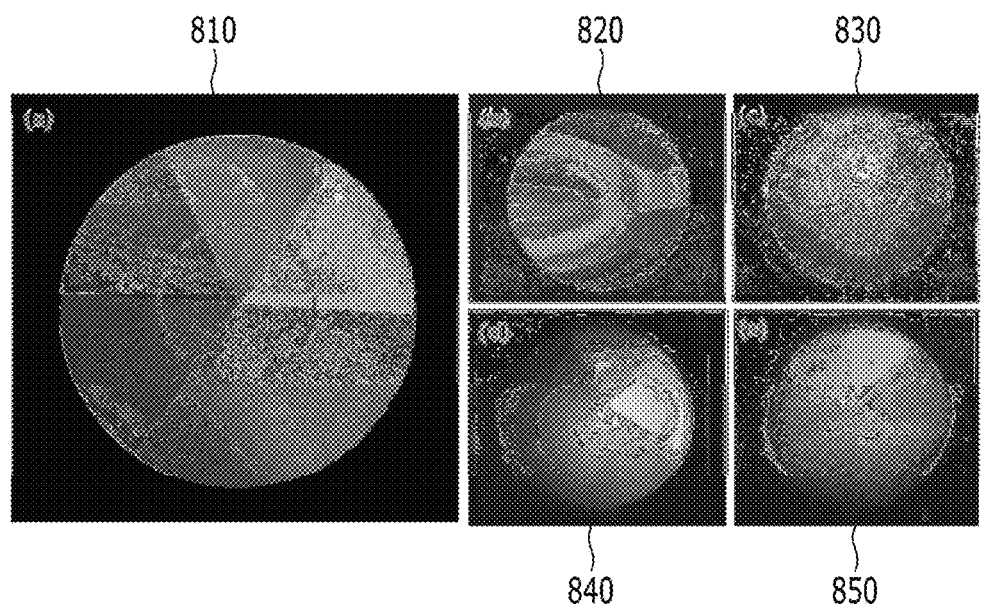

FIG. 9A and FIG. 9B are diagrams for explaining the rolling shutter phenomenon, and FIG. 10 and FIG. 11 are diagrams for explaining a result of high frame rate imaging by an ultrathin camera device according to an embodiment.

FIG. 9A shows an imaging method of a single lens camera and FIG. 9B shows a diagram for conceptually explaining an imaging method of an ultrathin camera device 100 using a microlens array.

A single lens camera uses one image sensor for one lens and a rolling shutter type image sensor that is mainly used stores images in chronological order. Therefore, an image distortion occurs for a fast moving object in the single lens camera.

Meanwhile, since the ultrathin camera device 100 performs imaging the light of several microlenses with one image sensor, each microlens can acquire an image in a relatively short time.

Accordingly, the ultrathin camera device 100 can acquire array images clearly captured by each microlens in the direction of the rolling shutter.

Therefore, the ultrathin camera device 100 can perform imaging a very fast moving object without distortion, simultaneously capture the object at different moments using the microlens array 120, and provide a high frame rate image by combining the array images.

Referring to FIG. 10, there show an image 770 of a rotating fan, an image 780 taken with a shutter speed of 1 ms by a general single-lens camera, array images 790 taken with the same shutter speed of 1 ms by an ultrathin camera device 100, and HDR images 800 that are acquired through merging the array images 790 in each row by HDR Merging Technology.

Referring to the image 780, due to the rolling shutter effect, the shape of the fan is distorted and one star appears to be three. However, from each array image 700, it can be seen that little distortion in the shape of the fan occurs and the one star is seen as it is.

Referring to FIG. 11, there show a color disc 810 of six equal parts, an image 820 acquired by a single-lens camera, and images 830, 840, 850 acquired by ultra-thin camera devices 100 having different lens diameters. The diameters of the lenses for the image 830, the image 840, and the image 850 are 300 μm, 150 μm, and 100 μm, respectively. Comparing from the image 830, the image 840, and the image 850, it can be seen that as the diameter of the lens decreases, the color space uniformity of disc increases. In the image 830 taken by a 300 μm lens, the green color is imaged as having a big surface area. Meanwhile, in the image 850 taken by a 100 μm lens, each part of the color disc is imaged to have the nearly equal surface area.

Figure 12:
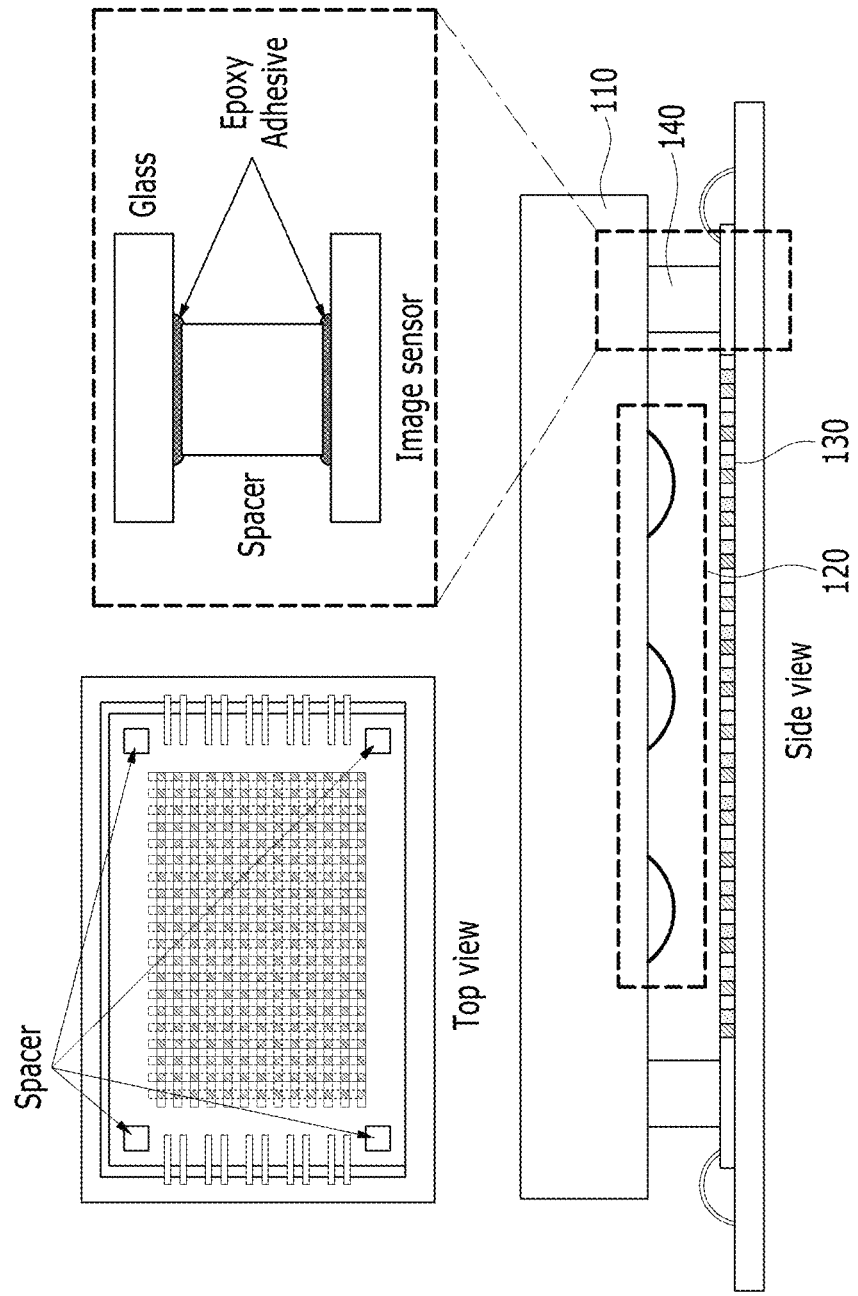
FIG. 12 is a diagram for explaining a packaging method of an ultrathin camera device according to an embodiment.

FIG. 12 is a diagram for explaining a packaging method of an ultrathin camera device according to an embodiment.

Referring to FIG. 12, in order to manufacture an ultrathin camera device 100 equipped with a thin camera, it is important to package an image sensor and a microlens with a short focal length. In FIG. 12, it is described that a microlens array 120 is attached to a transparent substrate 110. However, the optical module including the microlens array 120 may be designed in various ways as shown in FIG. 1.

Epoxy being an adhesive is applied to one end of a spacer 140 made of a micro-pillar by a dispensing technique and the spacer 140 is fixed to the image sensor 130. Likewise, the epoxy is applied to the other end of the spacer 140 and the optical module including the microlens array 120 is fixed on the spacer 140. At this time, a flip chip bonding equipment may be used and the microlens array 120 and the image sensor 130 are packaged with being aligned.

The spacer 140 is placed near the edge to fix the image sensor and the lens, but the location of the spacer 140 may be changed according to the shape of the lens. The height of the spacer 140 is the focal length of the lens and the tolerance of the micro-pillar height may be set according to the depth of focus of the lens. The entire height of the adhesive and the micro-pillar should be manufactured to be equal to the focal length.

The manufactured ultrathin camera device may have a total track length of less than or equal to 1 mm.

Figure 13:
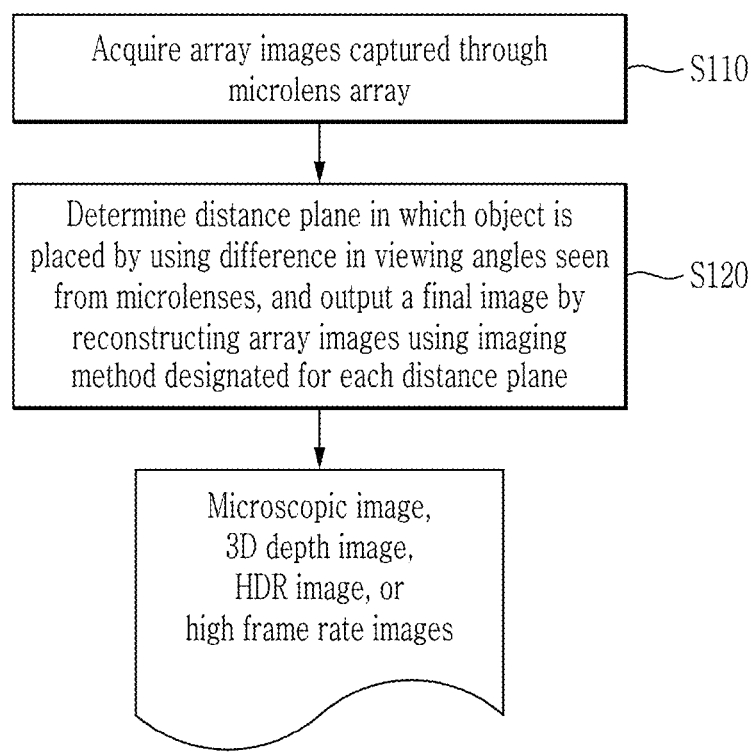
FIG. 13 is a flowchart showing a multifunctional imaging method of an ultrathin camera device according to an embodiment.

FIG. 13 is a flowchart showing a multifunctional imaging method of an ultrathin camera device according to an embodiment.

Referring to FIG. 13, a processor 200 acquires array images captured through a microlens array 120 (S110).

The processor 200 determines a distance plane (e.g., near plane, mid plane, and far plane) in which the object is placed by using a difference in viewing angles seen from the microlenses, and outputs a final image by reconstructing the array images using the imaging method designated for each distance plane (S120).

When the distance plane where the object is placed falls within short-distance, an image processing algorithm that generates a panoramic image/microscopic image by stitching the array images may be designated. When the distance plane where the object is placed is within medium-distance, a first image processing algorithm may be designated to generates a 3D depth image through estimating the depth of the object based on the disparity of the array images. When the distance plane where the object is placed is within long-distance, a second image processing algorithm may be designated to generate a HDR image by overlapping the array images. Further, when the distance plane where the object is placed is within long-distance, a third image processing algorithm may be designated to generate high frame rate images (high-speed images) from the array images.

As a result, the ultrathin camera device 100 can simultaneously image objects placed in various planes without changing the focal length by using the microlens array 120, and can provide various applications by reconstructing the array images with an image processing algorithm according to the distance plane.

According to an embodiment, objects placed on multiple planes can be simultaneously imaged using an ultrathin camera device, and very fast moving objects can be imaged at different moments. As a result, multifunctional applications such as microscope imaging at a short distance, 3D imaging at a medium distance, HDR imaging at a long distance, high speed imaging, and the like may be provided. According to an embodiment, since an ultrathin camera device has a very short focal length, not only long-distance imaging but also imaging an object placed at a very short distance without getting out of focus is possible. According to an embodiment, an ultrathin camera device can be used for various microscope imaging such as fingerprint recognition and skin imaging. According to an embodiment, since an ultrathin camera device has the same viewing angle and the same pitch, the distance from the object can be predicted through the degree of overlapping depending on the location of an object. According to an embodiment, an ultrathin camera device can generate a 3D image by reconstructing images based on distance information of an object. According to an embodiment, an ultrathin camera device can generate a HDR image by overlapping images acquired from lenses. According to an embodiment, an ultrathin camera device can perform high frame rate imaging by instantaneously capturing a very fast moving object while reducing image distortion caused by a rolling shutter effect. According to an embodiment, due to being manufactured to be ultrathin, an ultrathin camera device can be mounted on small devices such as a smartphone and a drone.

The embodiments of the present invention described above are not implemented only through an apparatus and a method, but may be implemented through a program for realizing a function corresponding to the configuration of the embodiments of the present invention or a recording medium on which the program is recorded.

Although the examples of the present invention have been described in detail above, the scope of the present invention is not limited thereto, and various modifications and improvements by those skilled in the art using the basic concept of the present invention defined in the following claims are also provided. It belongs to the scope of rights.

What is claimed is:

1. A camera device comprising:
    an optical module including a microlens array in which microlenses are arranged;
    an image sensor that outputs electrical image signals by sensing light coming through the microlens array;
    spacers that form a focal length by separating the optical module from the image sensor; and
    a processor that outputs a final image by reconstructing array images generated from the image signals with a designated imaging process depending on a distance at which the object is located,
    wherein each microlens has a shape of convexly protruded toward the image sensor,
    the processor determines a distance plane where an object is located by using a difference in viewing angles seen from the microlenses, and
    the processor determines that the object is placed in a short-distance plane when a distance calculated using a distance between two microlenses, a focal length of the microlens, and the difference in the viewing angles falls within an imaging range of one microlens.

2. The camera device of claim 1, wherein the optical module comprises:
    a transparent substrate; and
    a pinhole array layer that transmits light coming through the transparent substrate to the microlens array through pinholes filled with transparent material,
    wherein the microlens array is arranged corresponding to the pinholes of the pinhole array layer.

3. The camera device of claim 1, wherein each of the spacers is a micro-pillar to which an adhesive is applied, one end of which is fixed to the image sensor and the other end of which is fixed to the optical module.

4. The camera device of claim 1, wherein the processor generates a microscopic image by stitching the array images captured in a short-distance plane.

5. The camera device of claim 1, wherein the processor generates a 3D depth image by estimating a depth based on a disparity among the array images captured in a medium-distance plane.

6. The camera device of claim 1, wherein the processor generates a high dynamic range (HDR) image by overlapping the array images captured in a long-distance plane.

7. The camera device of claim 1, wherein the processor generates images of a moving object by concatenating the array images captured at different moments.

* * * * *